United States Patent

[11] 3,590,819

| [72] | Inventor | Lisbeth M. Kraft |
| | | P.O. Box 607, Goshen, N.Y. 10924 |
| [21] | Appl. No. | 781,190 |
| [22] | Filed | Dec. 4, 1968 |
| [45] | Patented | July 6, 1971 |

[54] SEMI-SOLID NURSING DEVICE
9 Claims, 5 Drawing Figs.

[52] U.S. Cl. ............................................. 128/252,
119/71, 119/1
[51] Int. Cl. ..................................................... A61j 11/04
[50] Field of Search .......................................... 128/252,
359, 360; 215/11—11.4; 119/71

[56] References Cited
UNITED STATES PATENTS

| 2,163,330 | 6/1939 | Snapp | 119/71 |
| 2,708,421 | 5/1955 | Jauch | 119/71 |
| 2,846,103 | 8/1958 | Maxwell | 215/11 |
| 3,134,494 | 5/1964 | Quinn | 215/11 |
| 3,220,382 | 11/1965 | Carpenter | 119/71 X |
| 3,441,160 | 4/1969 | Levy | 215/11 |
| 3,500,831 | 3/1970 | Schaar | 128/252 |

*Primary Examiner*—Richard A. Gaudet
*Assistant Examiner*—Ronald L. Frinks
*Attorney*—LeBlanc and Shur ABSTRACT: There is disclosed herein an improved nursing device and nipple for use by human infants and also by infants of other mammalian species. For human infants, the nursing device is in the form of a rigid casing with a collapsible milk reservoir and an attached nursing nipple. For use by other mammalian species, e.g. in sterile breeding of laboratory animals, other configurations may be employed. The nipple itself is comprised of a body of semisolid open-celled resilient material such as sponge rubber molded to the shape of the mammary gland of the species for which the device is to be used. A nonporous covering is provided on the outside of the body with an opening for fluid withdrawal directly from the cellular structure of the body. A metering device attached to the undersurface of the nipple body provides control of fluid flow by means of a plurality of narrow openings.

PATENTED JUL 6 1971   3,590,819
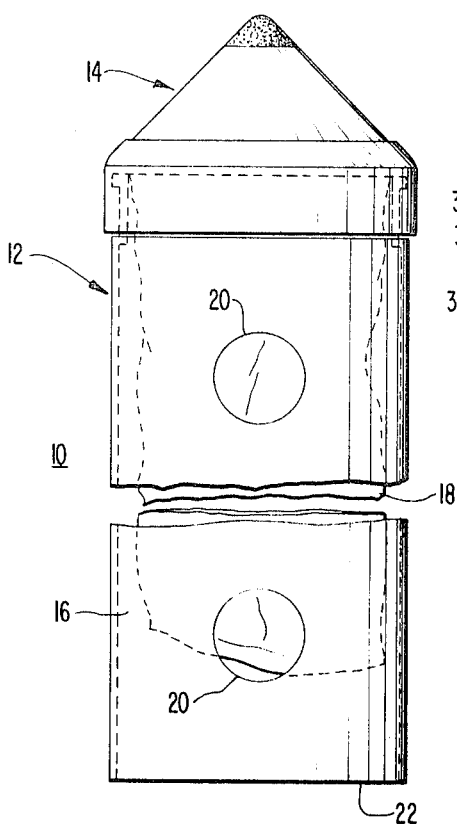
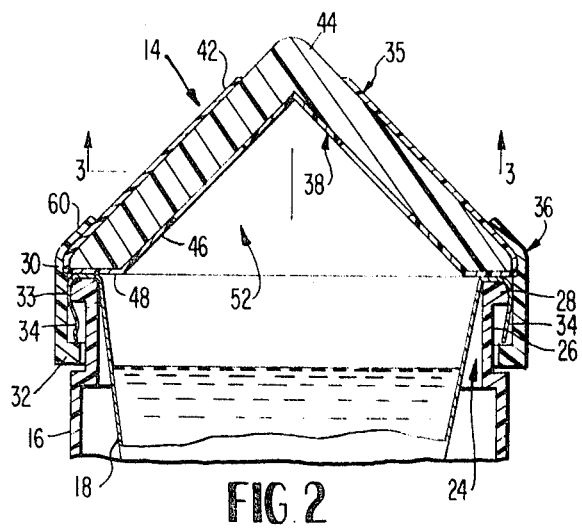
INVENTOR
LISBETH M. KRAFT
BY Le Blanc & Shur
ATTORNEYS

SEMI-SOLID NURSING DEVICE

The present invention relates to improvements in the construction of nursing devices for mammalian infants. One particular application of this invention is to improve success in the sterile rearing of laboratory animals. Another highly significant application of the invention is in the construction of improved nursing devices for human infants.

With respect to human nursing devices, currently available nipple and nipple-bottle combinations possess a significant disadvantage. In no case known does the nipple conform to the configuration, texture, or consistency of the natural lactating human breast. Whereas infants born at term may have the strength in their buccal and pharyngeal musculatures to overcome the difficulties created by the present nipples, premature infants may have great problems in attempting to suckle from them. For that reason their meals are often given by gavage.

An artificial nipple more closely simulating the natural breast would be advantageous to mature infants in reducing colicky disorders brought on by ingestion of air or by the too rapid ingestion of formula as well as any other idosyncratic factors associated with nursing from artificial devices.

Aside from the physiological benefits that might accrue from the more natural device, consideration must be given to psychological ones as well. Anything that more closely simulates the human natural condition would presumably be beneficial to the healthy psychological state of the nursling.

Improvement of laboratory techniques for sterile animal breeding is also of considerable importance.

Over the past decade those concerned with the study of the effects of new drugs, medical techniques, etc. have recognized the value of conducting these studies with live laboratory animals that have been bred under highly sterile germ-free conditions. A significant advantage of the use of germ-free animals is that the researcher can control test conditions more accurately, especially with respect to the previous exposure and/or disease history of the test animal.

For example, when it is desired to test the effect of a drug on a specific organism, it is highly advantageous for the researcher to be able to expose the test animal to that organism and to be confident that the effects of the drug are not a result of an earlier or simultaneous and unknown exposure to another organism.

Another example of the usefulness of sterile-bred animals would be in the use of test animals where contamination of the environment itself is to be avoided, e.g., in tests connected with manned space flight, etc.

The actual techniques employed in the initiation and maintenance of a sterile breeding program are well known to those skilled in the art and do not specifically constitute an aspect of this invention. However, by way of background, a sterile breeding program is initiated by taking a progenitor animal directly from the mother by Caesarean section. The operation is conducted in the sterile environment in which the animal is to be retained, or alternatively, the gravid uterus is aseptically removed from the donor animal and passed through a germicidal bath into a suitable sterile rearing chamber. At least one male-female pair is introduced into the sterile environment and is retained there throughout the period of time that sterile rearing and breeding is to be conducted.

Extreme care is utilized to assure that the environment for the breeding animals remains uncontaminated so that all subsequent progeny of the initial Caesarean born animals can be naturally born within the sterile environment with no further Caesarean operations.

As may be appreciated, sterile breeding of laboratory animals involves numerous problems of various kinds. One such problem is the provision of suitable feeding apparatus for the infants, especially those initially introduced into the sterile environment through the Caesarean operation. (As will be appreciated, it is not possible to introduce the lactating mother into the breeding chamber along with the offspring since this would immediately contaminate the sterile environment and nullify the object of the breeding program.) Thus, suitable means must be provided for conveniently feeding the infant without interference with the sterility of the environment. A related problem is the requirement that any apparatus used be capable of withstanding high temperatures or other adverse environments such as sterilizing gases which may be encountered during cleaning and sterilizing procedures.

Apart from the problem of sterility, it is frequently necessary to tailor the entire program with careful regard to the feeding habits of the particular species involved. For example, the feeding habits of infant mice may be so completely different from those of infant hamsters as to render practices satisfactory with one species of little value in connection with the other.

One approach to the foregoing problems is hand rearing, i.e., 24-hour personal attention to the derived infant with constant feeding and other care as required by the species involved up to the weaning age. Unfortunately, hand rearing has not been highly successful and in fact, has been totally unsuccessful to date in the case of hamsters. One of the principal reasons for the relative lack of success in this area has been the difficulty in devising suitable feeding apparatus.

Numerous contrivances have been employed in attempts to simplify and improve the chances of success in the feeding of nursing infants, but the majority of these attempts have not proved truly satisfactory, perhaps because the devices employed were not designed for the purpose but were originally intended for different purposes. For example, items ranging from medicine droppers to miniature toy milk bottles (e.g., such as accompany children's nursing dolls) and special rodent feeding catheters have been used.

In addition, numerous other devices which might be termed artificial udders, etc. have been constructed but none of these devices appears to be truly suitable for sterile breeding, for the aforementioned reasons, and especially in the case of many of the common laboratory animals, because these devices fail to approximate closely either the physical or functional characteristics of the mammary gland of the species.

In certain cases, for example, with cats, the results have been acceptable, at least in the sense that animals can be carried through to the weaning age in this manner, although the method does suffer from the disadvantage of an extremely low animal survival rate.

Another specific difficulty, e.g., in the case of hamsters, is the need to take account of certain special nursing habits. Under normal, i.e., natural conditions, the suckling infant hamster tends to attach itself to the lactating mammary gland of the mother and to remain attached for extended periods of time. Indeed, the animal is born with upper and lower incisors apparently for this very purpose. Observation indicates that the suckling infant would remain attached to the mother's mammary gland continuously during the first few days of life if permitted to do so by the mother. Also, the suckling hamster tends to be an extremely slow feeder, i.e., not only does it remain attached to the mammary gland for extended periods, but tends to withdraw its milk from the mother at a slow rate over a prolonged interval.

Moreover, the animals are apparently sensitive to gross disruptions of their feeding habits and appear to be nearly incapable of surviving the suckling period unless permitted to feed in a manner dictated by instinct. Thus, it has proven to be substantially impossible to initiate a sterile breeding program with hamsters even where the 24-hour hand rearing care can be provided.

As a result of the foregoing difficulties, considerable effort has been directed to devising a satisfactory (e.g. more "natural") alternative to hand rearing. Unfortunately, the only practical alternative which has been found is foster nursing of the derived animal wherein the nursling, after being introduced into the sterile environment, is allowed to nurse on a germ-free lactating female previously introduced into the sterile environment. Though this technique is satisfactory from the point of view of improved survival rate, it has the serious disadvantage of introducing into the derived animal and all its progeny any nonbacterial, e.g., viral contamination which may have been present in the foster mother. Moreover, in the case of hamsters, foster rearing on rats or mice has been totally unsuccessful. Thus, in the case of laboratory animal breeding, as in the case of human infants, artificial feeding means closely simulating the natural condition is a most desirable improvement.

Accordingly, it is a basic object of this invention to provide an improved method of nursing mammalian species.

It is a related object of this invention to provide an improved method of nursing laboratory animals wherein a feeding device closely simulating the physical and functional characteristics of the nursing female is employed so that the infant can self-feed in a manner closely approximating that which it would follow under natural conditions.

It is another basic object of this invention to provide an improved method of nursing laboratory animals which can be used in the initiation or continuation of a sterile breeding program.

It is a further object of this invention to provide an improved method of nursing laboratory animals in a sterile environment wherein artificial feeding apparatus is employed which simulates the physical characteristics of the lactating mammary gland of the particular species, and also which provides a rate of milk flow and other functional characteristics sufficiently similar to that of the natural mammary gland to permit self-feeding by the animal under nearly natural conditions.

It is another basic object of this invention to provide an improved feeding device for mammalian infants more closely simulating the natural condition then heretofore available devices.

It is also an object of this invention to provide an infant feeding device for humans having a nipple closely simulating the lactating human breast.

It is a further object of this invention to provide a nursing device for human infants which is advantageous both to term and premature infants in reducing ingestion of air and/or too rapid ingestion of formula.

It is yet another basic object of this invention to provide an improved nursing device for use in the initiation and continuation of sterile breeding for laboratory animals.

It is also an object of this invention to provide a feeding device which can be introduced into a sterile environment without causing contamination, and which can be cleaned and sterilized without damage.

The foregoing objects are achieved in the present invention by an improved feeding device including an artificial breast and nipple designed to simulate closely the size, shape and consistency of that portion of the natural organ for a particular species used by the nursling. The device is characterized by a semisolid cellular construction having an integrally formed outer skin and connected to a suitable milk reservoir by a metering device. The latter serves to control milk flow from the reservoir to maintain a supply of milk on demand of the infant and at the same time contributes to the establishment of a breast consistency characteristic of that species.

The exact nature of this invention, as well as additional objects and advantages thereof, will become apparent upon consideration of the following detailed description in conjunction with the attached drawing in which:

FIG. 1 is an overall view of one embodiment of the present invention;

FIG. 2 is an enlarged fragmentary vertical sectional view of the upper portion of FIG. 1, showing the construction of the nipple and its attachment to a typical nursing bottle;

FIG. 3 is a horizontal sectional view taken along line 3-3 in RI FIG. 2, showing the construction of the nipple;

FIG. 4 is a view similar to that shown in FIG. 3 illustrating the operation of the improved nipple arrangement of this invention; and FIG. 5 is a sectional view similar to that of FIG. 2 showing the construction of a modified version of the nipple.

Referring now to FIGS. 1 through 3, the concepts of the present invention have been illustrated as embodied in a feeding device for human infants. The illustrated form is intended only to be exemplary, since various aspects of the invention amendable to illustration are easily shown therein. However, it should be understood that the invention is directly applicable to improved feeding devices for mammalian species other than humans.

The infant feeding device of FIG. 1, generally indicated at 10, includes a bottle portion 12, and a nipple portion 14. Bottle portion 12 may be of several forms, but is preferably comprised of a rigid outer casing 16 and a thin-walled flexible inner milk sac 18. As shown, casing 16 is in the form of an elongated generally cylindrical tube having several large venting openings 20 along its length. The bottom 22 of tube 16 may be open as shown, or closed if preferred.

Casing 16 is formed of any suitable rigid plastic material which is nontoxic and capable of withstanding high-temperature sterilization, and/or chemical sterilizing agents which may be employed.

As best illustrated in FIG. 2, the upper end of casing 16 terminates in an open neck 24, which provides a fitting by which bottle 12 and nipple 14 may be attached together. In the embodiment illustrated, a snap fit closure is employed. This is formed by a circumferential recess 26 terminating at its upper end in an outwardly depending circumferential lip 28, having approximately the same diameter as the cylindrical body of casing 16. Recess 26 and lip 28 are adapted to engage with a complementary resilient portion of nipple 14, illustrated in FIG. 2 as a downwardly depending skirt 30, having an inwardly depending circumferential lip 32 at its lower end. Inner wall 33 of skirt 30 and lip 32 resiliently engage with lip 28 and recess 26, respectively on casing 16 to connect bottle 12 and nipple together securely. Other arrangements, e.g., a coarse thread closure of suitable type may be alternatively employed, if desired.

Milk sac 18 is a thin walled flexible tube or bag formed preferably of thin-guage plastic film such as polyethylene or Mylar. Feeding devices employing such milk sacs are known and are often used with vented casings such as illustrated herein. In use, removal of the liquid contents during feeding causes the milk sac to be collapsed by the pressure of the surrounding atmosphere. One advantage of an arrangement of this type is that it reduces the amount of air ingested by the feeding infant and is preferred in many instances for this reason.

As illustrated in FIG. 2, the upper end 34 of milk sac 18 is adapted to be turned inside out over circumferential lip 28 on casing 16 and is engaged between the latter and inner surface 33 of skirt 30. The foregoing arrangement is both simple and economical and has been found to be quite satisfactory in practice.

As will be appreciated, milk sac 18 may be disposable or reusable. In either case, it is necessary that suitable provision be made for sterility both for human and laboratory applications. For a disposable product, this can be assured by sterile manufacture, and by sterile packing, etc. to maintain the milk sac germ free prior to use. On the other hand, a reusable milk sac 18 should be formed of a material capable of withstanding heat or chemical sterilization. Appropriate material as described above, or suitable synthetic rubber may be used.

With particular reference to FIGS. 2 and 3, the improved nursing nipple 14 is formed of a shaped breast portion 35 terminating in downwardly depending connector portion 36, and a semirigid internal liner 38. Breast portion 35 is molded of a semisolid, open celled resilient material which provides an absorptive medium to serve as a temporary reservoir for the fluid in milk sac 18, and is molded to the proper shape to simulate the nipple and surrounding portions of the mammary gland of the particular species for which the device is to be used. Several open celled resilient materials are available and may be modified during manufacture to meet the requirements for cell size, rigidity, etc. as necessary.

One such suitable material is sponge rubber. This may be formed with cells ranging in size from small to large to satisfy the requirements of use for different species, but other materials having comparable properties may be substituted.

As illustrated, breast portion 35 is formed with an outer nonporous skin 42 which prevents leakage of fluid through the side of the nipple. Skin 42 is absent from the upper end of breast portion 35 to provide a milk discharge region for the nipple. This should be contrasted with conventional nipples in which a single orifice is provided for milk flow. Here, milk flow is provided in a manner closely approximating the natural condition, not only in regard to the actual flow mechanism but also in that the configuration and consistency of the breast portion can be selected to closely simulate the desired species. The latter is accomplished by forming the molded breast with proper size cells and desired skin thickness and configuration. The latter may be accomplished most simply by removing the skin 42 from an area 44 of the desired size by abrasion after the nipple has been molded.

Further control of milk flow and consistency of breast portion 35 is provided by internal liner 38. The latter is formed of a resilient cone of material such as Mylar or the like of sufficient thickness to provide the desired resiliency for the breast portion characteristic of the species involved. Liner 38 includes a tapered conical side 46 and a flat annular base 48.

Liner 38 is preferably attached to breast portion 35 to provide a one piece structure. This may be done after breast portion 35 has been molded by adhesive attachment to wall 46 and base 48. Alternatively, breast portion 35 may be molded directly onto liner 38 to provide an integral unit.

As mentioned, control of thickness of the liner as well as the stiffness of the material selected determines the consistency of breast portion 35. Use of the present invention in a feeder for calves or other relatively large animals will require a liner 38 of substantial thickness both for rigidity and support while in a feeder for mice, rats, etc. a relatively thin liner 38 providing less support will be satisfactory.

In addition to the structural properties described above, liner 38 also serves as a metering device to control flow of fluid from milk sac 18 into the cellular structure of breast portion 35. Thus, a series of narrow slits 50 are provided through liner wall 38. Slits 50 may be disposed longitudinally as shown or spirally, if desired. Because slits 50 are quite narrow, under ordinary conditions, even with feeding device 12 inverted and liquid filling the open space 52 within nipple 14, virtually no fluid flows through slit valves 50 into the cellular structure of breast portion 35. This is clearly illustrated in FIG. 3 wherein slits 50 are shown closed, thereby preventing fluid passage into breast portion 35.

In use, however, action of the suckling infant causes slit valves 50 to open, thereby admitting fluid into the reservoir formed by the cellular breast structure. Thus, as illustrated in FIG. 4, compression of the nipple by the nursling deforms breast portion 35, allows the slits to be widened, thereby exposing the absorptive cells to the fluid in open space 52.

As may be understood, the length of slit valves 50 determines the quantity of fluid which is admitted to breast portion 35. This, coupled with the rigidity of liner 38, the size of the cells in breast portion 35, and the exposed milk discharge area 44, determines the rate of flow of milk to the infant. By appropriate variation of these characteristics, the mammary gland of any desired species can be simulated.

In the event that substantial rigidity or firmness in breast portion 35 is not necessary, then a somewhat different nipple construction may be employed, as illustrated in FIG. 5. Here, instead of internal liner 38, there is substituted a unitary breast portion 35a essentially identical to breast portion 35 except that a nonporous skin extends over both the inner and outer surfaces. Thus, breast portion 35a is provided with an outer skin portion 42a terminating short of the apex of the breast portion to provide a milk discharge area 44a and an inner skin 54 having a liner portion 56 of generally conical configuration and an annular base 58 providing a cover for the entire inner surface of breast portion 35a.

As in the embodiment of FIG. 2, control of fluid flow into the cellular reservoir of breast portion 35a is provided by a series of slit valves. For the embodiment of FIG. 5, these are provided by a plurality of openings 58 spaced around inner skin portion 54.

Openings 58 are formed by abrasion of the skin surface after breast portion 35a has been molded, and are made sufficiently narrow so that when nipple 14 is not deformed, little or no fluid flow into the cellular portion of breast 35a is permitted. However, in use, when the nipple is deformed, openings 58 are stretched and fluid flow into breast portion 35a takes place as explained in connection with FIG. 4.

For either of the embodiments described, the connection arrangement shown in FIG. 2 may be employed. Connection portion 36 includes the downwardly depending skirt portion 30, previously described, and an upper portion 60 by which the breast portion 35 is attached. Connector 36 is formed of an elastic material such as silicone rubber or the like and is of such dimension as to fit tightly over neck 24 on casing 16. Alternately, a rigid material may be employed, especially for a threaded closure, rather than the snap fit shown.

In either case, breast portion 35 and connector 36 should be of unitary construction. The two parts may be attached after molding, or may be molded in one piece, if desired.

The above described construction represents a practical embodiment for a feeding device in accordance with this invention for human infants. For use with other species, certain modifications would be necessary. For example, the breast portion should be molded in the shape appropriate for the particular species involved. Likewise, the size, consistency, etc. will vary from species to species. For some applications, a plurality of separate breast portions may be molded on a single structure. In that case, separate slit valves, either in a rigid plastic liner, or in an internal molded skin, could also be provided.

With an arrangement of the type described herein, substantial improvements may be effected in the current practices in the field of sterile breeding of laboratory animals. For this application the cellular characteristics of the breast portion, the size of the fluid discharge region and the firmness of the inner liner as well as the actual configuration are carefully chosen in each instance so that the nursing infant is provided a feeding environment simulating the natural condition in all significant respects.

For those animals such as hamsters requiring a relatively continuous but small supply of milk, the feeding device may remain in the germ-free environment with the infant without the need for constant attention. The feeding device would be arranged with nipple portion in convenient reach of the infant, for example, in an inverted position on the underside of the fluid reservoir. A continuous milk supply may be provided from an external source, in which case, conventional flow control means may be provided to maintain the contents of the reservoir at the desired level.

Thus, the present invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to secure by United States Letters Patent is:

1. A nursing nipple for mammalian infants comprising: a breast portion formed of semisolid, open celled, highly resilient material and having a downwardly opening inner recess adapted to be exposed to a fluid reservoir to receive liquid therefrom; a nonporous integral skin covering a portion of the external surface of said breast portion and surrounding the base thereof, and extending toward the apex thereof, said skin terminating short of said apex to expose the cellular structure at the apex of said breast portion whereby fluid in said cellular body may be withdrawn by a nursing infant; connecting means for securing said nipple to a reservoir; metering means connected to the breast portion at the inner surface of the recess thereof for controlling the rate of fluid flow from said reservoir to said breast portion.

2. The nursing nipple of claim 1 wherein said breast portion is molded in the shape and consistency of the mammary gland of the species for which said nipple is to be used.

3. The nursing nipple of claim 1 wherein said breast portion comprises a molded body of sponge rubber.

4. The nursing nipple of claim 1 wherein the breast portion is substantially conical and the interior recess describes a triangle in cross section.

5. A nursing nipple for mammalian infants comprising: a semisolid, open celled, resilient breast portion adapted to be connected to a fluid reservoir, said breast portion having a downwardly opening recess therein, the recess adapted to receive fluid from the reservoir; a nonporous skin integral with the lower portion of the external surface of said breast portion, said skin extending upwardly from the base of said breast portion while exposing the cellular structure of said breast portion at the apex thereof to permit withdrawal of fluid therefrom by a nursing infant; semirigid metering means lining the recess of said cellular breast portion, said means having at least one narrow elongated slit adapted to provide communication between the fluid reservoir and said cellular body, said slit being normally closed when the nipple is not in use and open when said nipple is deformed by said nursing infant.

6. The nursing nipple of claim 5 wherein the cellular breast portion is substantially conical with an interior recess having a substantially triangular cross section, and wherein said nonporous skin describes the frustum of a cone on the lower external surface of said breast portion, and terminating short of the apex of said breast portion to permit withdrawal of fluid from the reservoir therethrough.

7. The nipple of claim 5 wherein the metering means further comprises a nonporous skin integrally molded on the inner surface of said cellular body and having at least one narrow elongated region in which said skin is removed thereby exposing the cellular structure of said body, said region being sufficiently narrow to prevent fluid flow when said nipple is not in use but permitting fluid flow when said nipple is deformed by a nursing infant.

8. The nipple of claim 7 wherein said metering means includes a plurality of narrow elongated regions, said regions extending upwardly from the base of said cellular body to the apex thereof.

9. The nipple of claim 8 wherein said narrow elongated regions are mutually spaced about the central axis of said cellular body.